US008882051B2

(12) United States Patent
Bleus et al.

(10) Patent No.: US 8,882,051 B2
(45) Date of Patent: Nov. 11, 2014

(54) CABLE HOLDER AS WELL AS KIT AND CABLE MANAGEMENT SYSTEM COMPRISING THE SAME

(75) Inventors: Heidi Bleus, Genk (BE); Ruth VanDoren, Sint-Joris Winge (BE); Danny Thijs, Zonhoven (BE)

(73) Assignee: Tyco Electronics Raychem BVBA, Kessel-Lo (BE)

( * ) Notice: Subject to any disclaimer, the term of this patent is extended or adjusted under 35 U.S.C. 154(b) by 0 days.

(21) Appl. No.: 13/149,344

(22) Filed: May 31, 2011

(65) Prior Publication Data

US 2011/0290953 A1    Dec. 1, 2011

(30) Foreign Application Priority Data

Jun. 1, 2010 (EP) ..................................... 10075235

(51) Int. Cl.
*F16L 3/22* (2006.01)
*H02G 3/30* (2006.01)
(52) U.S. Cl.
CPC ....................................... *H02G 3/30* (2013.01)
USPC .............. 248/67.7; 248/68.1; 248/73; 211/26
(58) Field of Classification Search
USPC ........... 248/68.1, 63, 74.1, 69, 49, 74.3, 74.4, 248/58, 61, 65, 62, 64, 67.7, 72, 73; 211/26; 174/100
See application file for complete search history.

(56) References Cited

U.S. PATENT DOCUMENTS

| 3,851,981 | A | * | 12/1974 | Corsi et al. | ..................... 403/237 |
| 4,083,312 | A | * | 4/1978 | Holman, Jr. | ..................... 410/97 |
| 6,215,069 | B1 | * | 4/2001 | Martin et al. | ................. 174/68.3 |

(Continued)

FOREIGN PATENT DOCUMENTS

| DE | 3819367 A1 | 12/1989 |
| DE | 9013096 U1 | 1/1991 |
| DE | 20004342 U1 | 7/2001 |

OTHER PUBLICATIONS

European Search Report issued by the European Patent Office, dated Nov. 2, 2010, for European Patent Application No. EP 10075235; 5 pages.

*Primary Examiner* — Steven Marsh
(74) *Attorney, Agent, or Firm* — Merchant & Gould P.C.

(57) ABSTRACT

The present invention relates to a cable holder for guiding a plurality of computer-network cables, including a loop with an inner circumference at least partially adapted to provide a support for the cables The loop is formed of a first leg and a second leg extending essentially parallel to each other and being interconnected at a proximal end segment of each of the first and the second leg via a yoke, and a closure section, arranged at a distal end segment of each of the first and the second leg. The closure section includes at least one flap which is arranged at the distal end segment of the first or the second leg and extends towards the opposing distal end segment of the second or the first leg, respectively. Further, the invention relates to a kit and a cable management system comprising the cable holder. In order to easily add and remove a plurality of cables to and from the cable holder, respectively, the present invention provides that the at least one flap abuts the opposing distal end segment of the second or the first leg, respectively, in a resting position of the at least one flap, the at least one flap being adapted to be resiliently deflected from its resting position.

20 Claims, 12 Drawing Sheets

(56) References Cited

U.S. PATENT DOCUMENTS

| | | | |
|---|---|---|---|
| 6,504,100 B2 * | 1/2003 | Lawrence et al. | 174/100 |
| 6,614,981 B2 * | 9/2003 | Zdinak et al. | 385/136 |
| 6,706,969 B1 * | 3/2004 | Young | 174/95 |
| 6,946,605 B2 * | 9/2005 | Levesque et al. | 174/100 |
| 7,119,282 B2 * | 10/2006 | Krietzman et al. | 174/101 |
| 7,207,542 B2 * | 4/2007 | Conway et al. | 248/458 |
| 7,857,670 B2 * | 12/2010 | McGrath et al. | 439/701 |
| 2009/0283645 A1 | 11/2009 | Nikayin | |

* cited by examiner

CABLE HOLDER AS WELL AS KIT AND CABLE MANAGEMENT SYSTEM COMPRISING THE SAME

The present invention relates to a cable holder for guiding a plurality of computer-network cables, comprising a loop with an inner circumference at least partially adapted to provide a support for the cables, the loop being formed of a first leg and a second leg extending essentially parallel to each other and being interconnected at a proximal end segment of each of the first and the second leg via a yoke, and a closure section, arranged at a distal end segment of each of the first and the second leg, wherein the closure section comprises at least one flap which is arranged at the distal end segment of the first or the second leg and extends towards the opposing distal end segment of the second or the first leg, respectively.

Further, the present invention relates to a kit comprising at least one cable holder and a plurality of mounting brackets adapted to be attached to the cable holder, wherein the mounting brackets comprise an attachment section, the attachment section adapted to be attached to the cable holder, and a mounting section, the mounting section being adapted to be fixed to a supporting structure of an electronic device or rack.

Moreover, the present invention relates to a cable management system for guiding a plurality of computer network cables at a rack or cabinet for electronic devices.

Cable holders are known from the prior art. They are used for fastening cables to a supporting structure. For example, document U.S. Pat. No. 5,463,189 A describes a cable holder in the form of an installation clip with a pair of resilient retaining arms which extend outwardly from a base member and define a clip channel into which electric cables can be placed. Shoulders on the distal ends of the retaining arms define an inlet into the clip channel. Thereby, an open loop is formed, wherein a plurality of spaces is provided which separate the clip channel into a plurality of sub-regions. These regions are each sized to receive an electric cable.

Another clip is known from document GB 2253650 A, this clip comprises two legs being interconnected via a yoke, the back of the yoke being provided with a fastening member, such as a threaded bolt.

In modern day communications systems, the cables have to be exchanged and rearranged frequently. These systems commonly include a large number of cables for interconnecting pieces of telecommunications equipment, e.g. for local area network application. Suppliers and users of structured connectivity communications systems in these local area networks often have difficulty managing the cabling and patching points. Because of a large number of cables present at such patching points, cable management is crucial. Cable management involves efficiently routing cables to minimize the space occupied by such cables. Cable management also involves routing cables in an orderly manner so as to prevent the cables from tangling.

With known cable holders, cable management is cumbersome because the cables are clamped or bound to the holder and stacked one above each other in the loop of the holder. Hence, the cables may not be easily rearranged and exchanged.

In view of these disadvantages of the prior art, an object underlying the invention is to provide a cable holder and a cable management system, wherein cables may be guided and secured, yet easily exchanged and rearranged.

This object is achieved according to the invention in that the at least one flap abuts the opposing distal end segment of the second or the first leg, respectively, in a resting position of the at least one flap, the at least one flap being adapted to be resiliently deflected from its resting position.

For a kit and a cable management system mentioned in the beginning of the description, the object is achieved in that they comprise at least one cable holder according to the present invention.

These solutions provide comfortable cable management in that the cables may be easily added or removed to or from the loop by being pushed against the flap which is thereby displaced and the closure section is opened. After displacement, the flap returns to its resting position, wherein it closes the cable holder. Hence, on one hand, the cables are held and guided within the cable holder in a captive manner. On the other hand, the cables may be rearranged within the loop such that they may be handled and replaced individually. Therefore, the present invention enables a comfortable cable management, wherein the cables may be easily removed and added from and to the holder, respectively, without additional tools necessary and even in a singe-handed manner.

The solutions according to the invention can be combined as desired and further improved by the following further embodiments that are advantageous on their own in each case:

According to a first possible further embodiment of a cable holder according to the present invention, the at least one flap may overlap with the opposing distal end segment of the second or the first leg, respectively, in a radial direction of the loop. This facilitates undetatchably guiding the cables within the loop such that they may not inadvertently be removed from the loop. Due to the resiliently deflectable flap, the cables may however still be easily added and removed to and from the loop, respectively.

According to another possible embodiment of a cable holder according to the present invention, the resiliency of the flap may be easily provided in that the at least one flap is at least partially formed of flexible material. Hence, any mechanical parts for providing resiliency, such as a spring mechanism for example, may be omitted. The cable holder may therefore be manufactured in a cost-efficient way and may be more wear-resistance as if it would comprise mechanically moving parts such as joints and springs.

The resiliency and deflectabilty of the flap may be further improved according to another possible embodiment of the present invention, in that the at least one flap has an essentially triangular cross-section in an axial direction of the loop, the essentially triangular cross-section tapering in the direction of the opposing further end segment of the second or the first leg, respectively. Hence, especially when formed of flexible material, the tip of the flap may be more resilient than its root, which further facilitates deflecting the flap for opening the closure section.

The accessibility of the loop may be further improved according to another possible embodiment of a cable holder according to the present invention in that it is provided that at least one further flap overlaps the at least one flap in the radial direction of the loop, the at least one further flap being located at the opposing distal end segment of the second or the first leg, respectively. The two flaps may extend from the respective end segments of the legs towards each other such that they abut and overlap in their resting position and may be displaced in a way that they slide open and clear a space for adding or removing a cable in a displacement position of the flaps.

According to another further embodiment of a cable holder according to the present invention, the cable holder may be easily mounted to a supporting structure in that a fastening organ may be arranged at a back of the yoke partly constituting the outer circumference of the loop, the fastening organ being adapted to attach a mounting bracket thereto.

The mounting bracket may be easily attached to and detached from a cable holder according to the present invention in that the fastening organ may comprise a slit which is adapted to accommodate an attachment section of the mounting bracket. The slit can be easily provided for example in that it is formed between a latch and the back of the yoke, and in that the back of the yoke is formed as an essentially flat base facing in a radial direction of the loop. Hence, the slit may run perpendicularly in a longitudinal direction of the legs and the mounting bracket may be easily attached to the cable holder in a predefined angle with respect to the legs. Attaching the mounting bracket to the cable holder may be facilitated in that the latch is provided with a nib which extends from the latch towards the back of the yoke and is adapted to snap behind a counter latching organ formed at the mounting bracket. Thereby, the mounting bracket may be easily affixed to the cable holder without any auxiliary parts or tools.

According to another possible further embodiment of a cable holder according to the present invention, affixing the cable holder to a supporting structure at a predefined angle with respect to the structure can be easily provided in that the longitudinal direction of the slit may extend away from the yoke in a radial direction of the loop. For example, the slit may be formed between two cheeks which are formed at the back of the yoke and extend therefrom in the radial direction of the loop.

According to another possible embodiment of a cable holder according to the present invention, the cables may be easily prevented from being cut or folded in that an inner circumference of the loop may be at least partially rounded in an axial direction of the loop. Hence, a transition between a radial centre line of the loop and an edge of the loop facing in an actual direction of the loop may be provided, that prevents the cables from being notched when being supported in the loop and hanging down therefrom.

According to another further embodiment of a cable holder according to the present invention, it may be provided that a height of the cable holder being measured perpendicularly to the extension of the first and the second leg essentially corresponds to the rack unit height of a standardised rack format. Thereby, a controlled area for patch cables and pigtails using the full capacity of an available rack height unit can be provided. The standardized rack format may be the 19-inch or 23-inch format for example. The height of one rack unit may be approximately 4.445 cm (1.75 inches) for example.

According to another possible embodiment of a cable holder according to the present invention, several cable holders stacked above one another may be easily coupled to each other such that several cable holders stacked above each other in an aligned manner may be easily swivelled or pivoted jointly, in that an upper side and/or lower side of the cable holder at least one coupling organ is provided, which is adapted to engage with another cable holder above and/or below the cable holder, respectively.

A kit mentioned in the beginning of the description, comprising at least one cable holder according to the present invention, may be further improved in that the attaching section and the mounting section of at least two out of the plurality of mounting brackets define different angles between each other. Thereby, the kit enables to mount the cable holder to a supporting structure in a desired angle suitable for each individual application. Such angles may be essentially 45°, 90° or 180°, for example. Of course, the angles may also be in the range of 30° to 60°, 60° to 120°, or 120° to 150° or 150° to 180°, for example.

The invention will be described in more detail by way of example hereinafter using ad embodiments and with reference to the drawings. The described embodiments are only possible configurations in which the individual features may however, as described above, be implemented independently of each other or may be omitted. Corresponding elements illustrated in the drawings are provided with the same reference signs. Parts of the description relating the same elements illustrated in different drawings are omitted.

Figure 1:
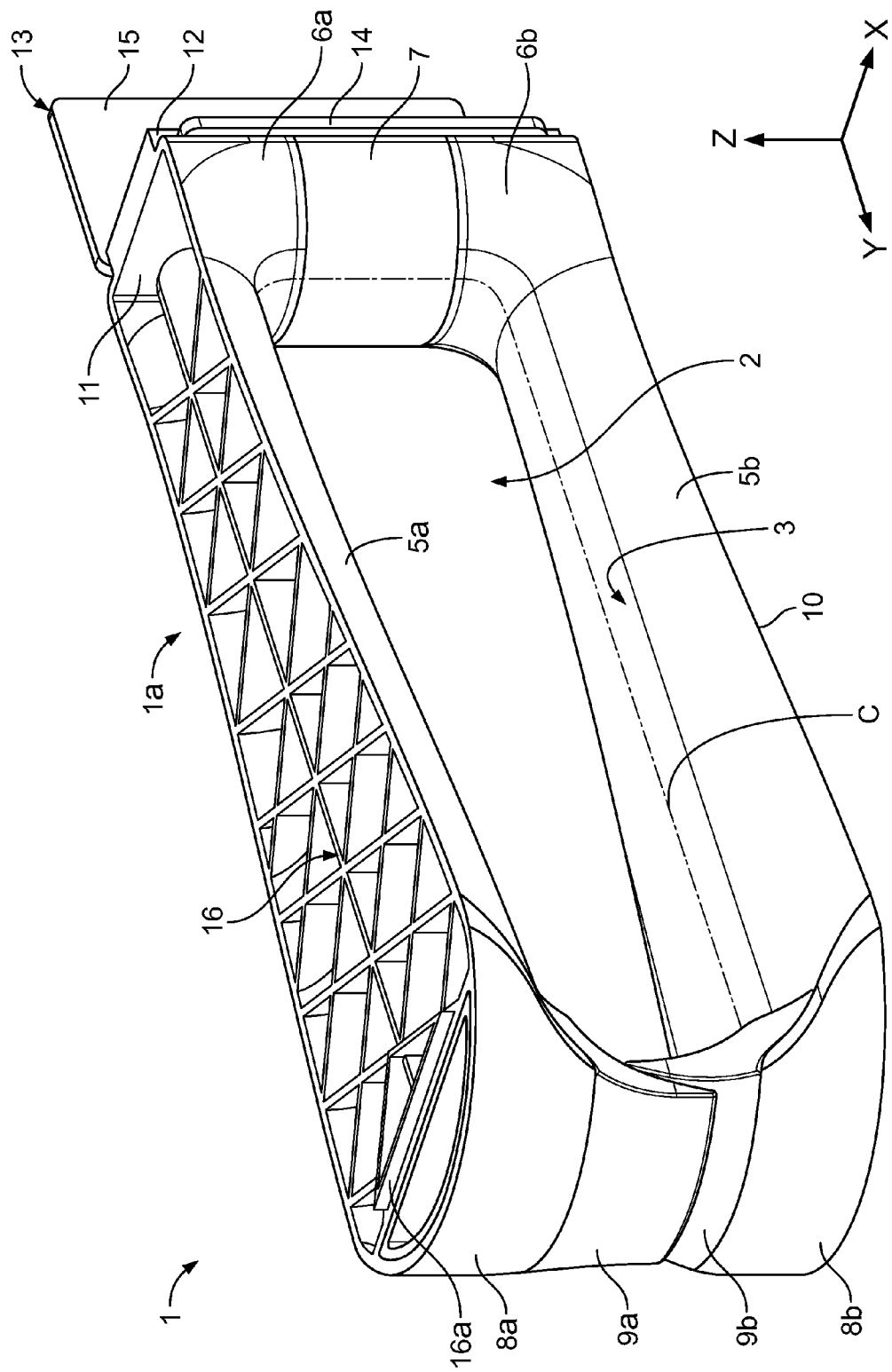
FIG. 1 is a schematic perspective view of the upper side of a cable holder according to an embodiment of the present invention.

As shown in FIG. 1, a cable holder 1 according to the present invention comprises a loop 2 with an inner circumference 3 providing a support 4 for cables (not yet shown). The loop 2 may be constituted by a first leg 5a and a second leg 5b. The first leg 5a and the second leg 5b each have a proximal end segment 6A and 6B, respectively. At their proximal end segments 6A and 6B, the legs 5a and 5b are interconnected via a yoke 7. The first leg 5a and the second leg 5b each have a distal end segment 8a and 8b, respectively. At their distal end segments 8a and 8b, the legs 5a and 5b are each provided with a flap 9a and 9b, respectively. On their outsides facing away from the loop, the legs 5a, 5b constitute an upper side 1a and a lower side 1b of the cable holder, respectively.

Further, the inner circumference 3 is designed such that it is rounded between a radial centre line C and an edge 10 of the loop 2 facing into an axial direction X of the loop 2. At a back side 11 of the loop 2 facing into a radial direction Y of the loop 2, a fastening organ 12 is provided which is adapted to fasten a mounting bracket 13 to the cable holder 1. The mounting bracket 13 comprises an attachment section 14 for fastening the mounted bracket 13 to the cable holder 1 and a mounting section 15 which is adapted to be mounted to a supporting structure (not yet shown).

In order to provide that the cable holder 1 may carry the weight of several cables without being deformed, the legs 5a and 5b are provided with a gill structure 16 which also helps to save material while assuring a certain stability of the legs 5a, 5b. The gill structure 16 is formed such that on their outsides facing away from the loop 2, the legs 5a, 5b constitute the flattened upper side 1a and lower side 1b of the cable holder 1. On the upper side 1a, the cable holder 1 is provided with an upper coupling organ 16a protruding from the upper side 1a in a height direction Z of the cable holder. The height direction Z running perpendicularly to the axial direction X and the radial direction Y. The upper coupling organ 16a is adapted to engage with a lower counter coupling organ (not yet shown) of another cable holder 1 which may be located above the cable holder 1 such that their upper side 1a and lower side 1b, respectively, abut each other or at least run parallel under a minimal distance in the height direction Z to each other.

Figure 2:
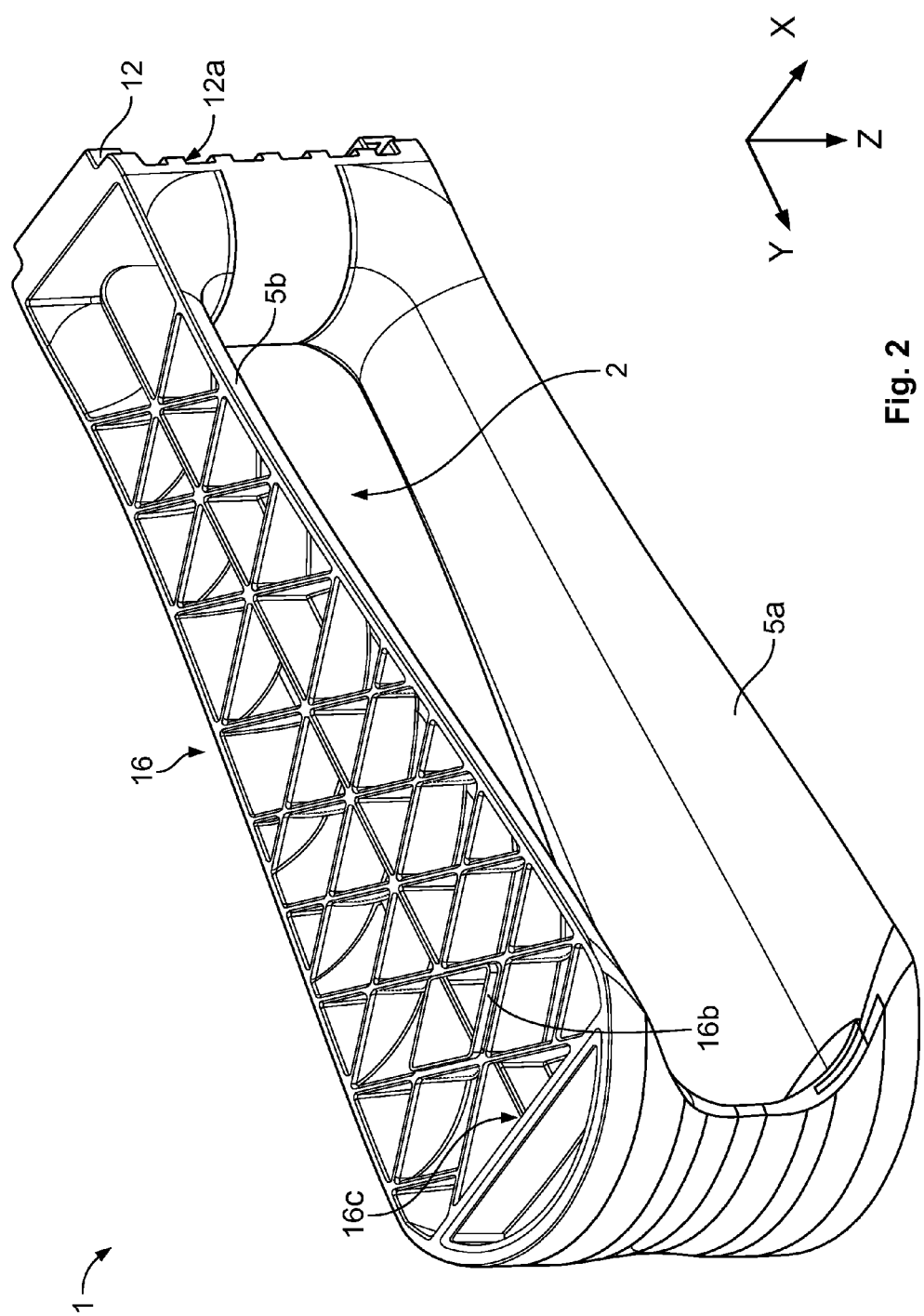
FIG. 2 is a schematic perspective view of the underside of an embodiment of a cable holder according to the present invention.

FIG. 2 shows the lower side 1b of the cable holder 1 illustrated in FIG. 1. The lower side 1b is provided with a lower coupling organ 16b which protrudes from the second leg 5b against the height direction Z. The lower coupling organ 16b is adapted to engage with an upper counter coupling organ (not yet shown) of another cable holder 1 located below the cable holder 1. Next to the lower coupling organ 16b, a lower counter coupling organ 16c is formed which is adapted to accommodate the upper coupling organ 16a of another cable holder 1 which may be arranged below the cable holder 1.

Further, the fastening area 12 may be provided with a guiding structure 12a in the form of ribs running parallel to the axial direction X such that a mounting bracket 13 attached to the fastening area 12 may be guided and firmly held.

Figure 3:
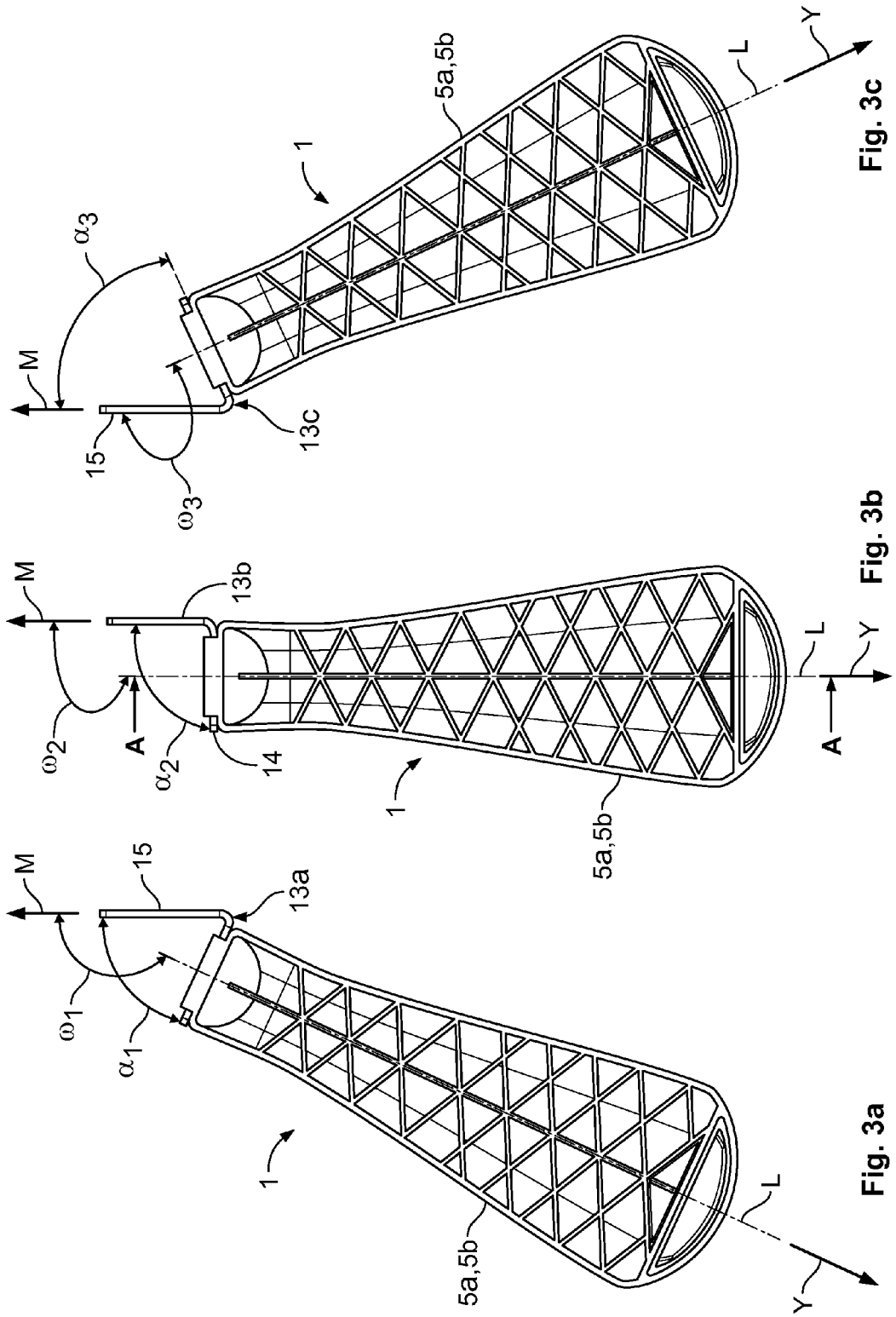
FIGS. 3a to 3c are schematic top views of cable holders according to the present invention being provided with different mounting brackets.

FIGS. 3a to 3c show cable holders 1 provided with different types of mounting brackets 13a to 13c. The mounting brackets 13a to 13c differ in that their attachment sections 14 have different mounting angles $\alpha_1$ to $\alpha_3$ with respect to their mounting sections 15, respectively. The mounting angles 1 to 3 may be 45°, 90° and −45°, respectively, for example. As the attachment sections 14 run perpendicularly to a longitudinal axis L of the legs 5a, 5b, an angle of 90° may be added to the mounting angles $\alpha_1$ to $\alpha_3$ in order to obtain an orientation angle $\omega_1$ to $\omega_3$ of the longitudinal axis L with respect to a mounting direction M of each of the mounting sections 15. In this case, the radial direction Y runs parallel to the longitudinal axis L of each of the legs 5a, 5b. Orientation angles $\omega_1$ to $\omega_3$ of the legs 5a, 5b with respect to the mounting direction M may equal $\alpha_1$ plus 90°, $\alpha_2$ plus 90° and $\alpha_3$ plus 90°. For example, the orientation angles $\omega_1$ to $\omega_3$ may therefore have values of 135°, 180°, and 45°, respectively, depending on the respective mounting angle $\alpha_1$ to $\alpha_3$.

Figure 4:
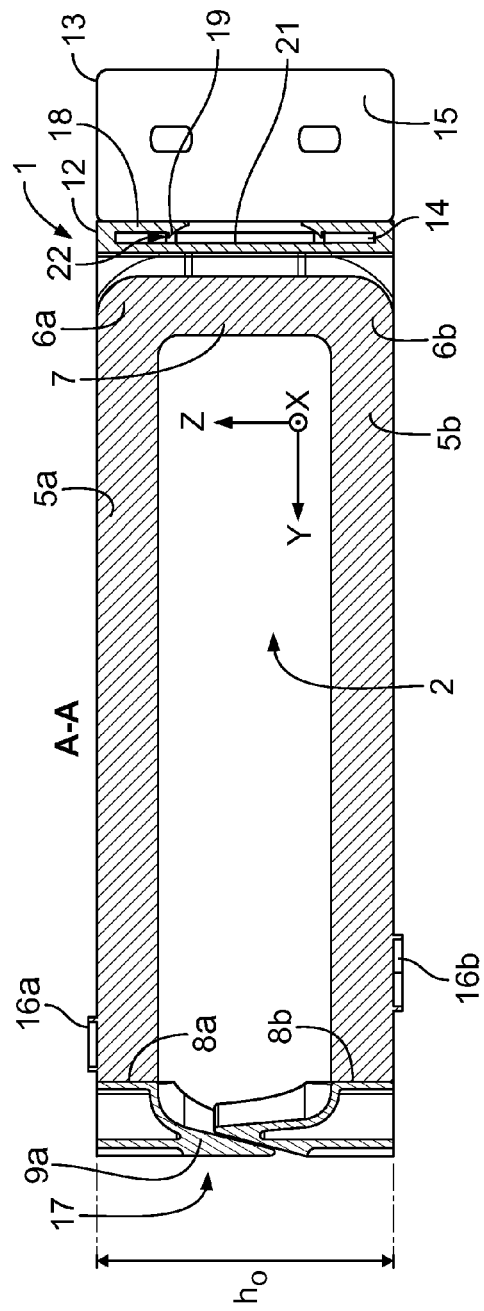
FIG. 4 is a schematic cross-sectional view of the cable holder shown in FIG. 3b along the cross-sectional line A-A illustrated in FIG. 3b.

FIG. 4 is a schematic cross-sectional view of the cable holder 1 along the cross-sectional line A-A illustrated in FIG. 2b. From FIG. 3 it becomes evident that the loop 2 may be constituted by the two opposing legs 5a, 5b and a closure section 17 comprising the flap 9a and the further flap 9b, the closure section 17 opposing the yoke 7.

Further, the fastening organ 12 comprises two latches 18 which are each provided a nib 19. A slit 20 is formed between a back of the yoke 21 at an outer circumference of the loop 2 and the latches 18. The fastening section 14 of the mounting bracket 13 is inserted into the slit 20. The fastening section 14 is provided with two counter latching organs 22 in the form of apertures which accommodate a nib 19 of the latches 18.

An outer height $h_o$ of the cable holder 1 including the mounting bracket 13 may be essentially the height of a rack unit of a standardized rack format. Hence, the outer height $h_o$ may be approximately 4.445 cm or less for example.

Figure 5:
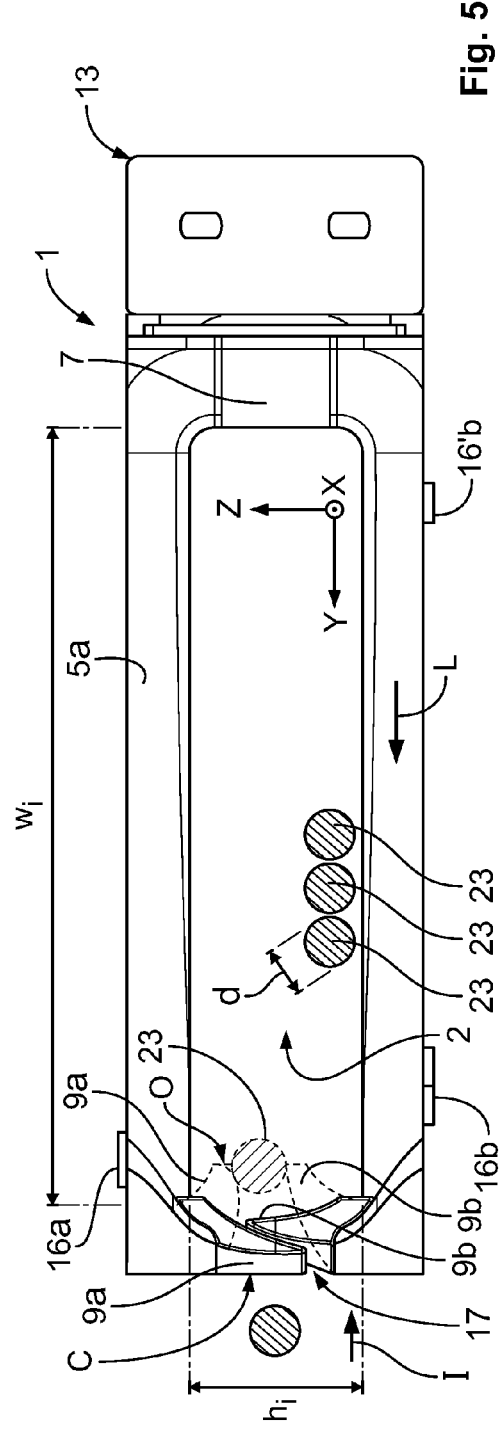
FIG. 5 is a schematic side view of a cable holder according to the present invention and cables managed therewith.

FIG. 5 shows the cable holder 1 in a perspective side view. Here it becomes evident that an inner height $h_i$ of the loop 2 measured in the height direction Z and an inner width $w_i$ of the loop 2 measured parallel to the longitudinal axis L of the legs 5a, 5b both exceed a diameter d of cables 23. Hence, the loop 2 may accommodate multiple cables 23 which may be arranged next to each other in the radial direction Y and/or may be stacked above each other in the height direction Z. In each case it is assured that the cables 23 may be rearranged and moved within the loop 2 in order to individually pass the closure section 17 by deflecting the flaps 9a and 9b. The inner height $h_i$ and the inner width $w_i$ may preferably be at least twice as big as the diameter d of the cables 23.

The flexibility of the flaps 9a, 9b provides that the cables 23 may be easily inserted into the loop 2 in an insertion direction I of the cable holder 1 and may be easily removed from the loop 2 in a removal direction R of the cable holder 1. The insertion direction I and the removal direction R opposing each other and running parallel to the radial direction Y and the longitudinal axis L of the legs 5a and 5b.

In FIG. 5, the flaps 9a and 9b are illustrated in a resting position C, where the closure section 17 is closed because the flaps 9a and 9b abut each other and overlap in the radial direction Y. The flaps 9a, 9b and the cable 23 are further illustrated with dashed lines in a deflected position O of the flaps 9a and 9b. In the deflected position O the closure section 17 is in an open state where the flaps 9a and 9b leave a slit open in order to let through one of the cables 23.

Figure 6:
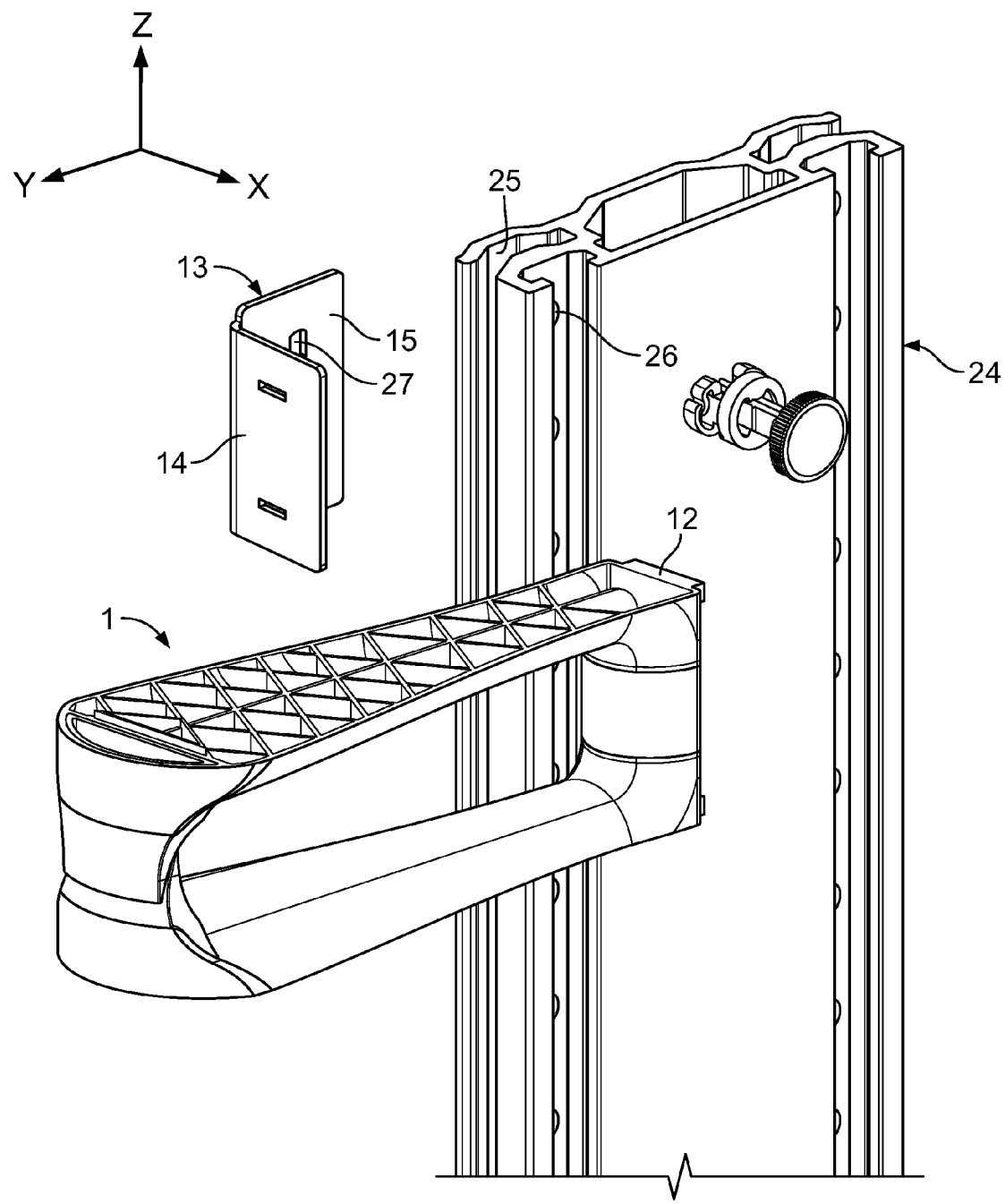
FIG. 6 is a schematic view of a cable holder according to the present invention ready to be mounted to a profiled beam of a supporting structure with the help of a mounting bracket.

FIG. 6 shows the cable holder 1 in a schematic perspective view together with a mounting bracket 13 and a supporting structure 24 in the form of a profiled beam which may be a part of a cabinet or rack. The supporting structure is provided with a fixation organ 25 in the form of a positioning groove which is provided with fixation elements 26 in the form of through-holes reaching through a side wall of the supportive structure 24 into the fixation organ 25, i.e. the positioning groove.

The cable holder 1 may be easily mounted to the supporting structure 24 by sliding the fastening section 14 of the mounting bracket 13 into the fastening organ 12 of the cable holder 1. Then, the mounting section 15 of the mounting bracket 13 may be inserted into the fixation organ 25. A position of the cable holder 1 in the height direction Z may be easily adjusted by sliding the mounting section 15 along the extension of the fixation organ 25 and choosing fixation elements 26 at the desired height for affixing the mounting section 15 in the desired position in the height direction Z by a fastening means, e.g. a screw or a bolt, which may be inserted into the fixation elements and may jut through the mounting elements 27 having the form of through-holes.

Figure 7A:
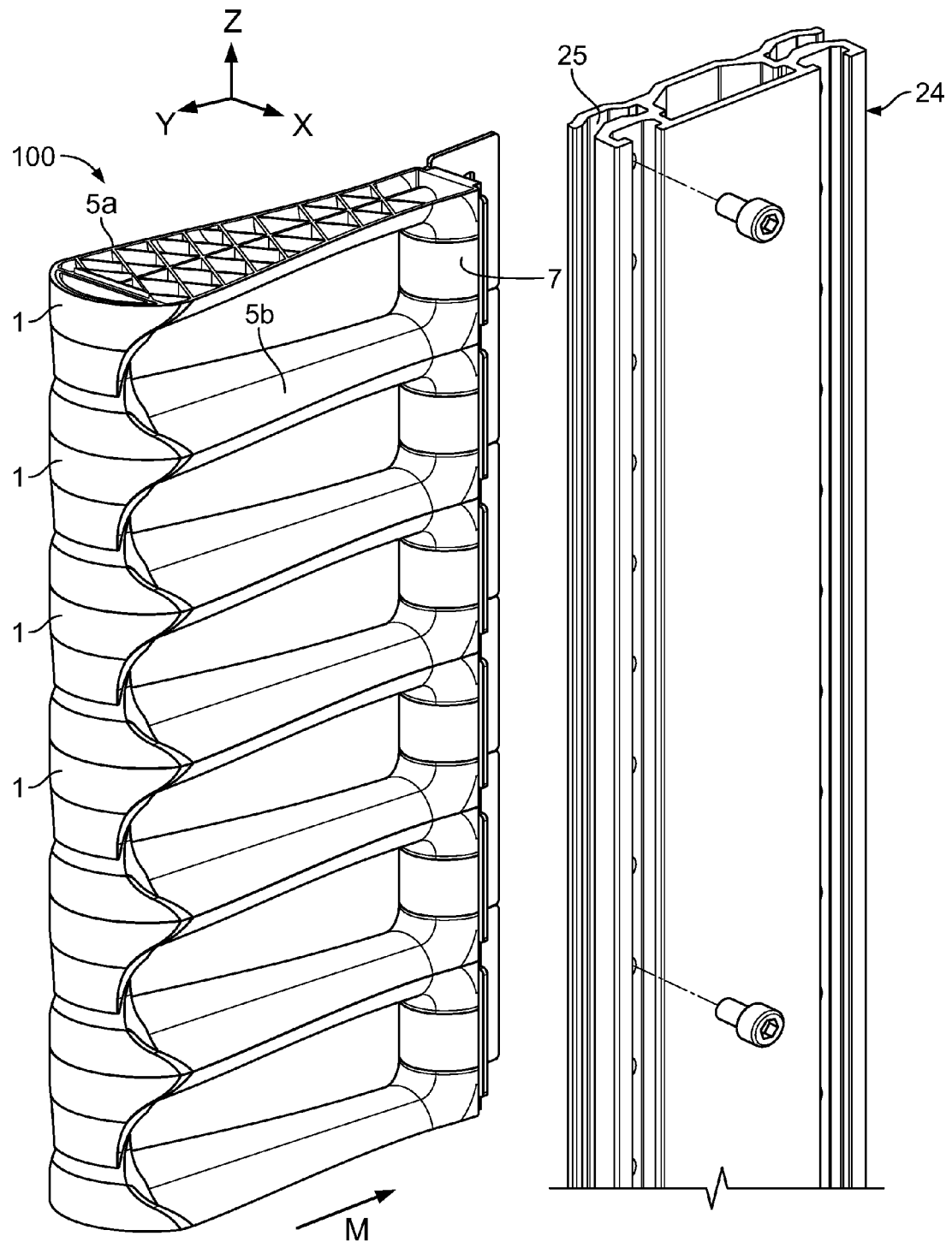
FIG. 7a is a schematic perspective view of a cable management system comprising a plurality of cable holders according to the present invention, the cable management system arranged to be mounted to a profiled beam of a supporting structure.

FIG. 7a shows a plurality of cable holders 1 combined as a cable management system 100. The cable management system 100 comprises a plurality of cable holders 1 stacked above each other in the height direction Z. As the cable holders 1 are attached to the mounting bracket 13 at their respective yokes 7 which form a narrow side of the cable holders 1, and the extension of the cable holders 1 in the radial direction Y is larger than in the height direction Z, the first leg 5a and the second leg 5b constitute a long side of the cable holders 1. The flat design of the cable holder 1 provides that the cable management system 100 has a high cable capacity for cables from any electronic device at a certain rack unit height. The electronic device may comprise any equipment therefor, including passive components such as patch panels, switchboards, etc.

Figure 7B:
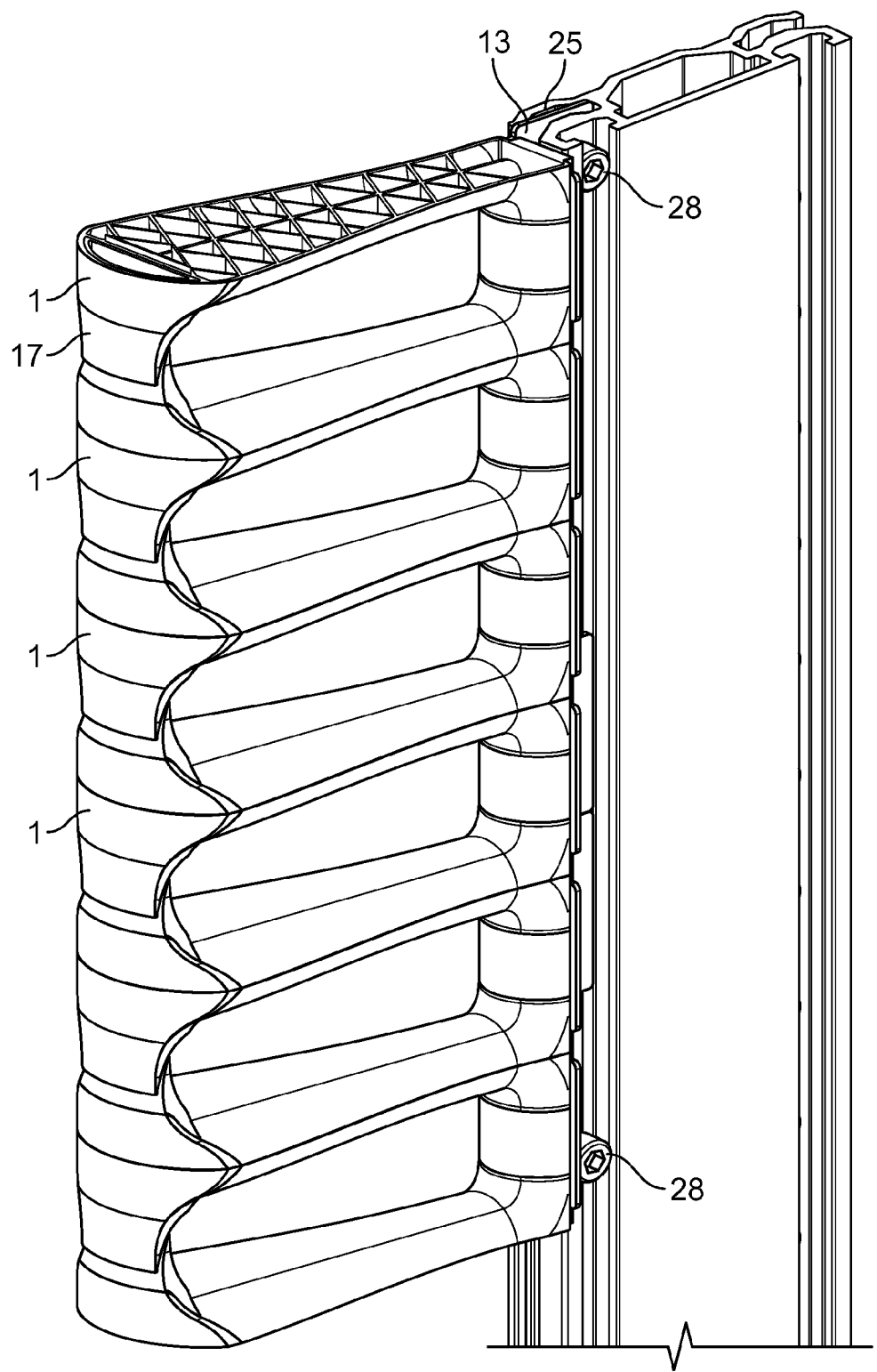
FIG. 7b is a schematic perspective view of the cable management system shown in FIG. 6 mounted to the profiled beam.

FIG. 7b illustrates the cable management system 100 in a mounted state where the mounting bracket 13 is affixed to the fixation organ 25 by fastening means 28 in the form of screws. As can be seen, the plurality of cable holders 1 of the cable management system 100 are mounted together by a single fastening bracket 13 holding each of the cable holders 1. The fastening bracket 13 is mounted to the supporting structure 24. Hence, the plurality of cable holders 1 may be easily mounted to the supporting structure 24 via a shared mounting bracket 13.

Figure 8:
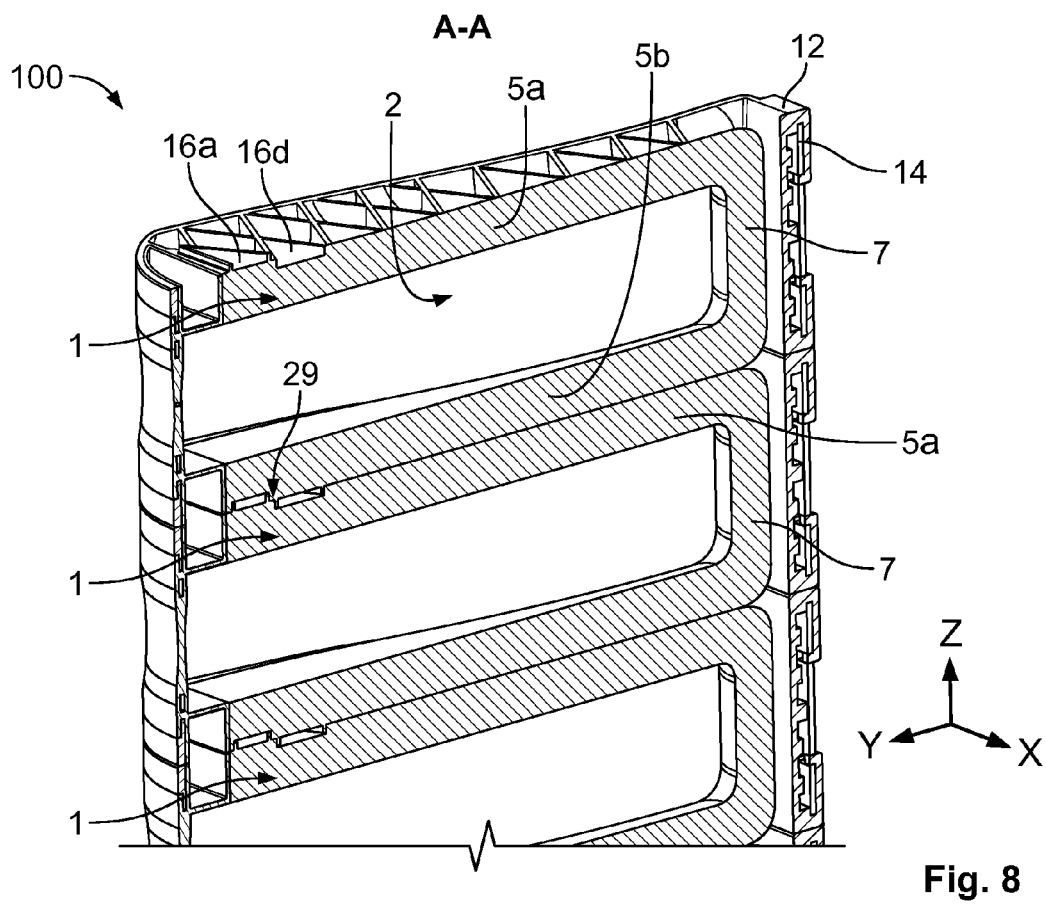
FIG. 8 is a schematic perspective cross-sectional view of a part of the cable management system shown in FIGS. 7a and 7b along the cross-sectional line A-A illustrated in FIG. 3b.

FIG. 8 shows a schematic perspective cross-sectional view of the cable management system 100 shown in FIGS. 7a and 7b along the cross-sectional line A-A in FIG. 3b. Next to the upper coupling organ 16a on the upper side 1a of the cable holder 1, an upper counter coupling organ 16d is arranged which is formed as a recess a contour of an inner circumference of which matches the outer contour of the lower coupling organ 16b. A coupling section 29 of the cable management system 100 includes the coupling organs 16a to d which are adapted to engage with each other.

Figure 9:
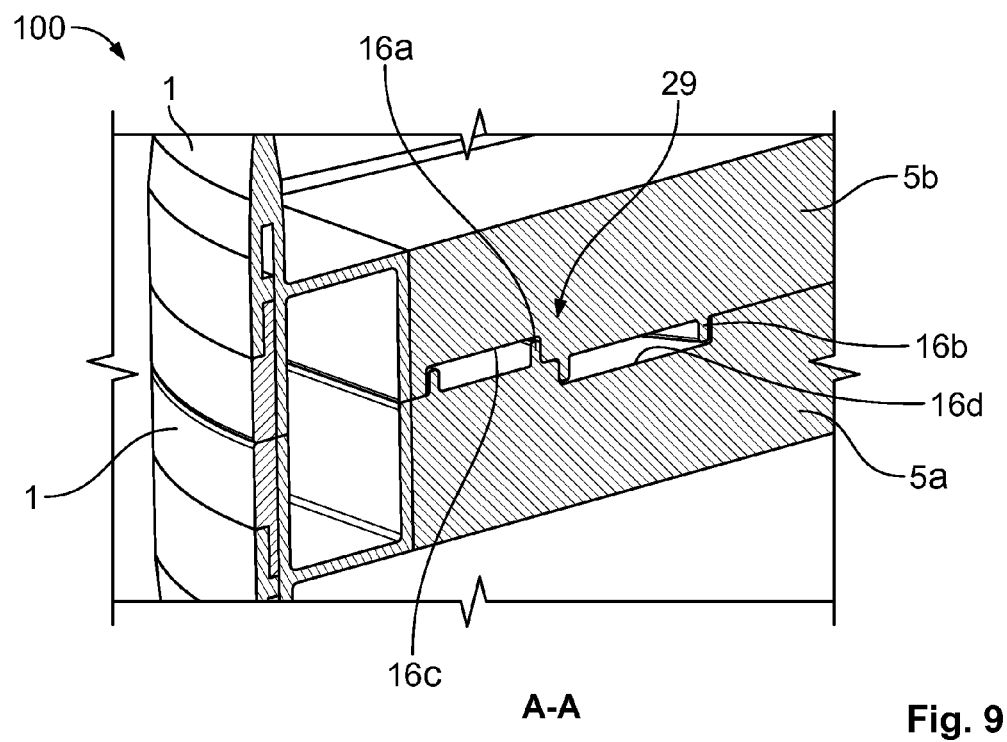
FIG. 9 is a schematic perspective view of a coupling mechanism of the cable management system shown in FIG. 8.

FIG. 9 shows the coupling section 29 illustrated in FIG. 1 in detail. Here it becomes evident that the upper coupling organ 16a juts into the lower counter coupling organ 16c and the lower coupling organ 16b juts into the upper counter coupling organ 16d. Thereby, the leg 5b of the upper cable holder 1 and the leg 5a of the lower cable holder 1 are in engagement with each other. This enables to pivot the entire cable management system 100 in one piece around a pivot axis may run parallel to the height direction Z. In other words, the coupling section 29 provides for an alignment of all cable holders 1 which are stacked above each other in the cable management system 100. For aligning the cable holders, the coupling organ 16a to 16d engage with each other such that the single cable holders 1 within the cable management system 100 are clamped to each other.

Figure 10:
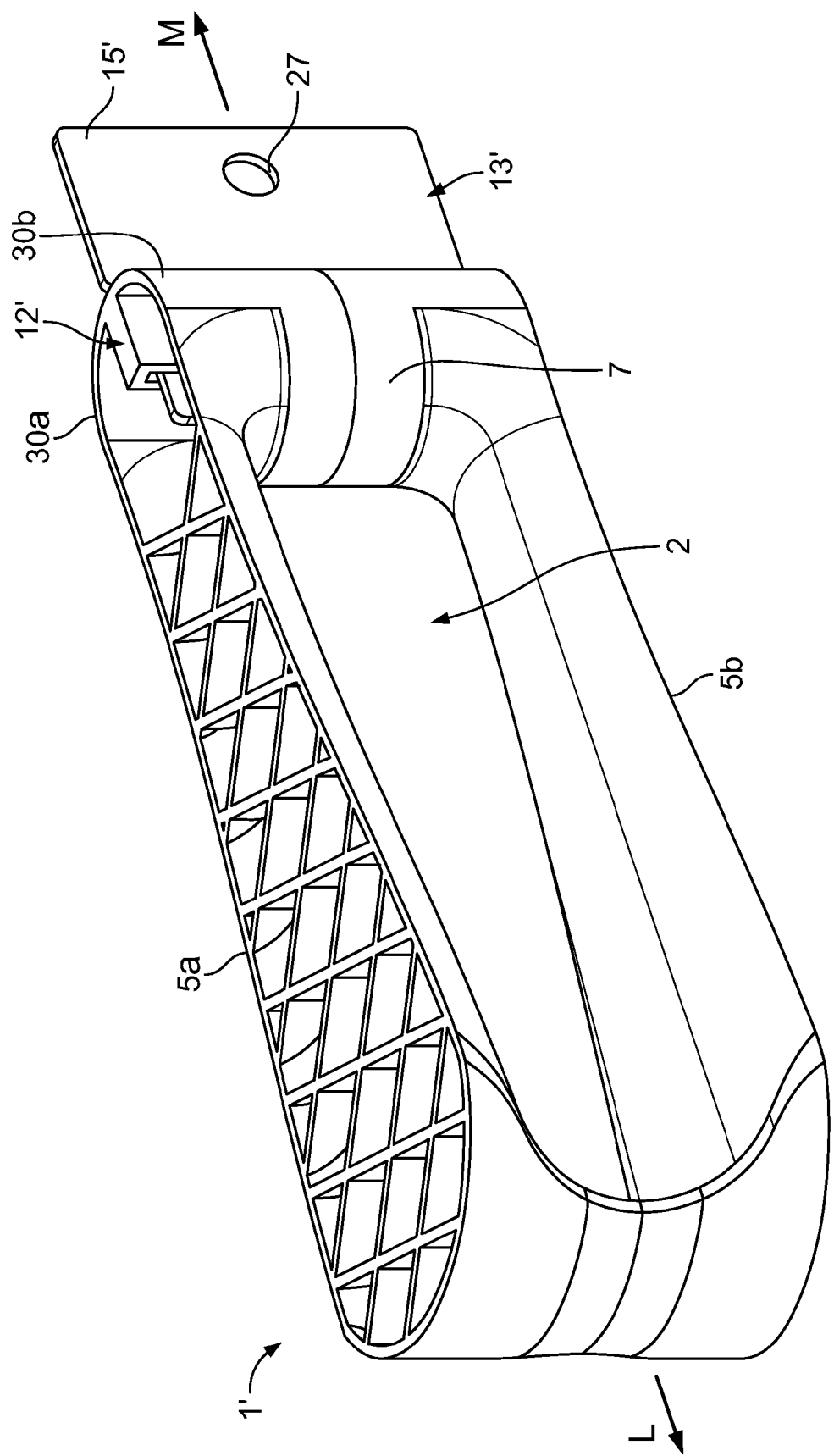
FIG. 10 is a schematic perspective view of another embodiment of a cable holder according to the present invention.

FIG. 10 shows another embodiment of a cable holder 1' according the present invention. The cable holder 1' differs from the cable holder 1 illustrated in FIGS. 1 to 7 in that cable holder 1' has a fastening organ 12' providing a slit 20' running parallel to the longitudinal axis L of the cable holder 1'. The slit 20' is arranged between two cheeks 30a and 30b extending from the yoke 7 in the mounting direction M.

A fastening section 14' of a mounting bracket 13' sits within the slit 20'. A mounting section 15' of the mounting bracket 13' extends from the cable holder 1' in the mounting direction M.

Figure 11C:
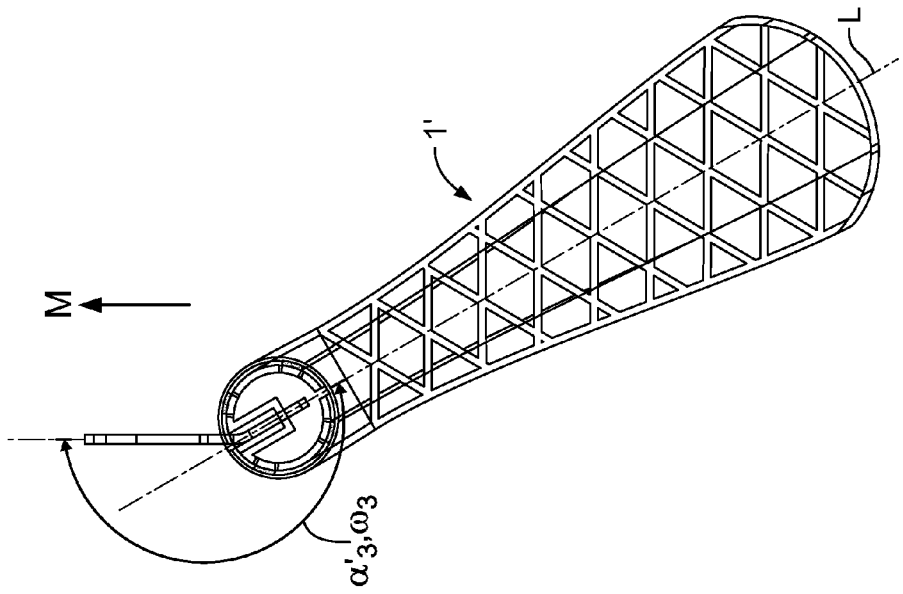
FIGS. 11a to 11c are schematic top views of cable holders according to the present invention provided with different mounting brackets.
Figure 11B:
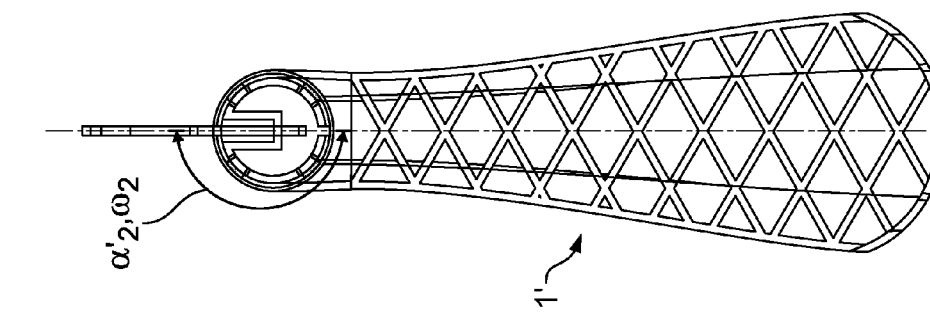
Figure 11A:
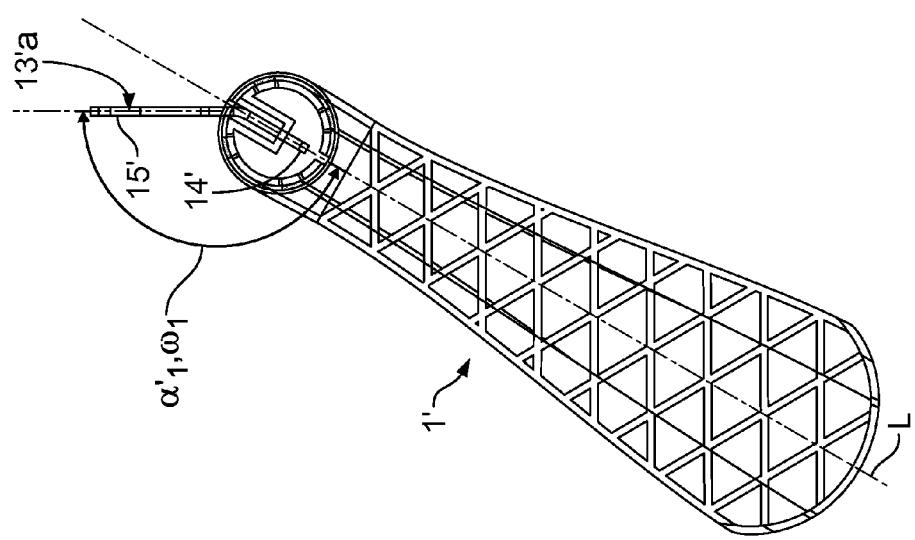

FIGS. 11a to 11c show three cable holders 1' provided with respective mounting brackets 13'a to 13'c, respectively. Mounting angles $\alpha_1$' to $\alpha_3$' between the fastening sections 14' and the mounting sections 15' of the mounting brackets 13'a to 13'c, respectively, correspond to the orientation angles $\omega_1$ to $\omega_3$, respectively.

Figure 12:
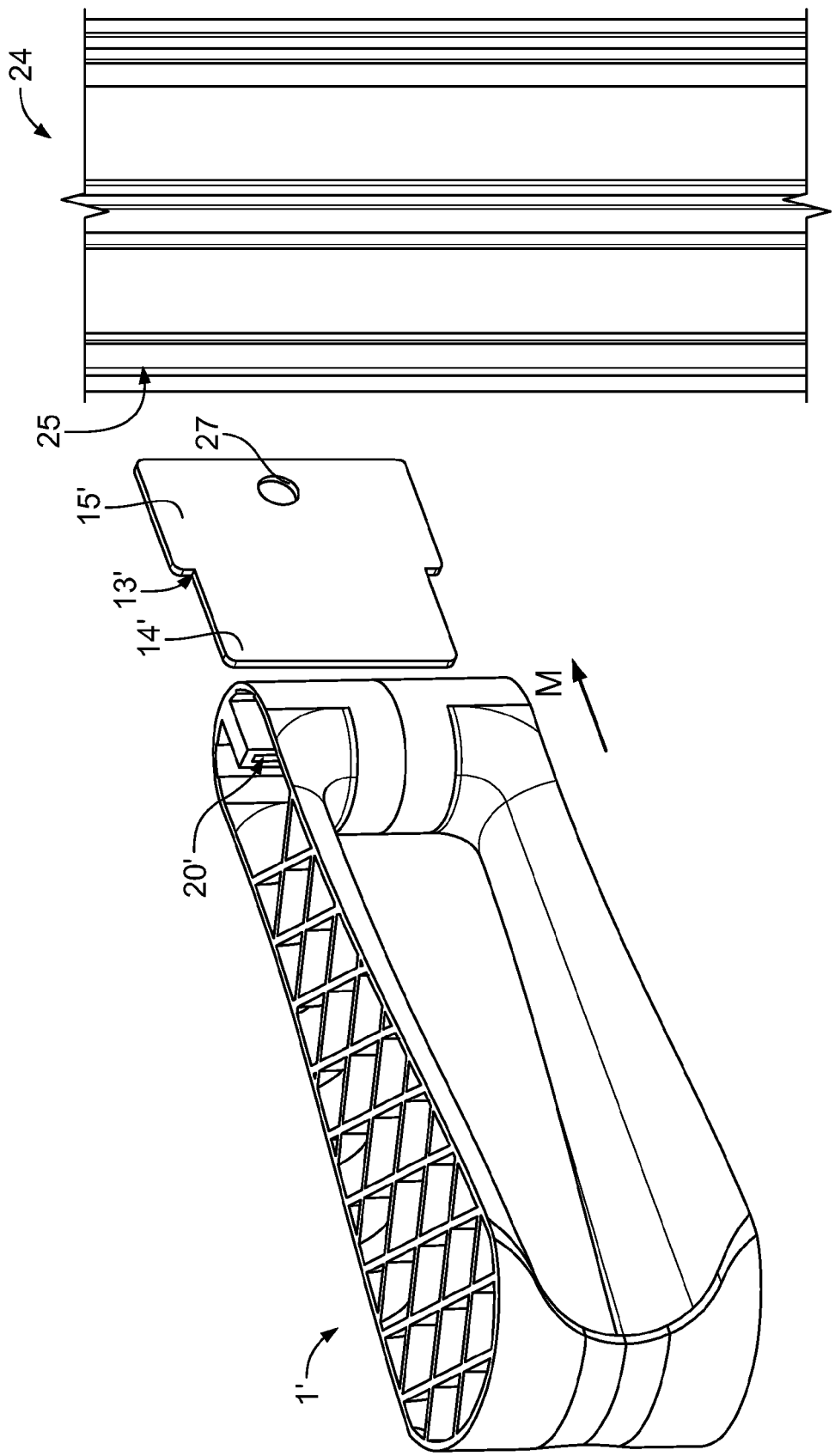
FIG. 12a is a schematic perspective view of the cable holder shown in FIG. 10 arranged to be mounted to a profiled beam of a supporting structure.

In FIG. 12, the cable holder 1' is illustrated in a position where it is ready to be mounted to the supporting structure 24 by inserting the fastening section 14' into the slit 20' formed at the back of the yoke 7 and inserting the mounting section 15' of the mounting bracket 13' into the fixation organ 25 of the supportive structure 24.

Figure 13:
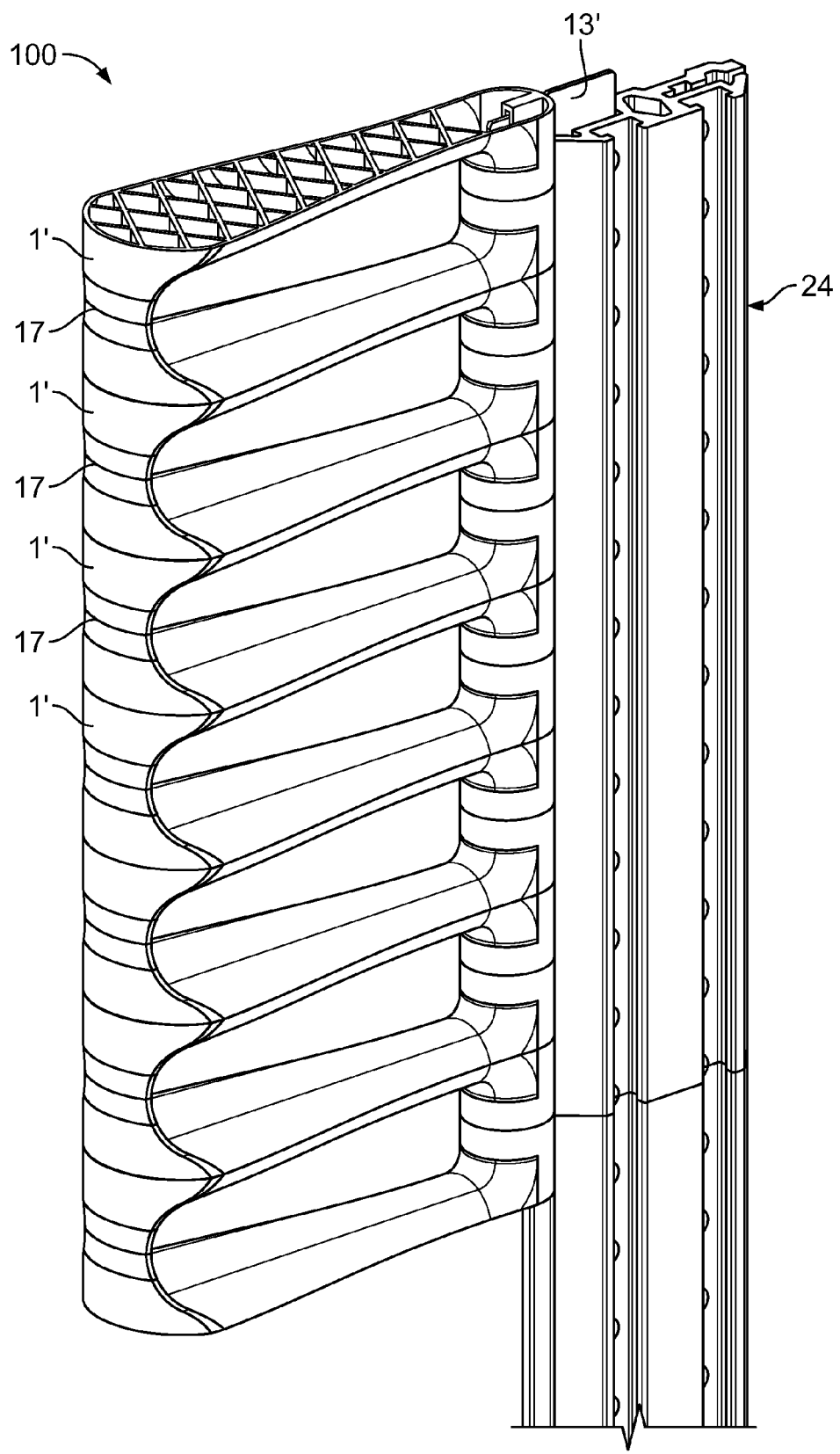
FIG. 13 is a schematic perspective view of a cable management system comprising a plurality of cable holders according to the present invention, the cable management system being mounted to a profiled beam of a supporting structure.

FIG. 13 shows the cable management system 100 comprising a plurality of cable holders 1'. Analogously to the cable management system 100 illustrated in FIG. 7, the cable holders 1' are together fastened to the mounting bracket 13' which is affixed to the supporting structure 24.

Deviations from the above described embodiments of the cable holder 1, 1' and the cable management system 100 according to the invention are possible within the inventive idea:

The cable holder 1, 1' may provide a loop 2 in any desired shape suitable for accommodating a plurality of cables 23. It is, however, advantageous if the cable holder 1, 1' as illustrated herein extends in a longitudinal direction and has an outer circumference with flattened long sides formed by the legs 5a and 5b, such that a plurality of cable holders 1, 1' may be stacked one above each other in the form of a cascade. For such a cascade it is advantageous that the closure section 17 of the cable holders is located at a narrow side of the cable holders at the distal ends 8a, 8b of the legs 5a, 8b, such that the loop 2 is freely accessible via the respective closure section 17 and there is no need to dismantle or detach the cable holders 1, 1' in order to insert or remove cables 23.

The flattened upper side 1a and lower side 1b of the cable holders 1, 1' are advantageous for stacking the cable holders 1, 1' above each other. As two cable holders 1, 1' of the cable management system 100 may be placed above each other, their flattened sides are advantageously running parallel to each other and may abut each other. In that respect, it should also be understood that the radial direction Y of the loop 2 may be any direction extending radially from the centre of the loop.

The coupling section 29 may comprise coupling organs 16a to d in whatever form appropriate for aligning several cable holders 1, 1' stacked above each other. It is advantageous if upper coupling organs and upper counter coupling organs 16c as well as lower coupling organs 16b and upper counter coupling organs 16d are formed such that their contours provide a positive-locking. By inter-locking several cable holders 1 with the help of coupling sections 29 between those cable holders, the single cable holders may easily be aligned and jointly pivoted.

The inner circumference 3, support area 4, first leg 5a, second leg 5b, proximal ends 6a, 6b, yoke 7, distal end segments 8a, 8b and flaps 9a, 9b may be formed in any way suitable for a certain application. The flaps 9a, 9b may be formed of flexible material like rubber for example or may be provided with a mechanical spring mechanism such that their flexibility is provided. If the flaps 9a, 9b are formed of flexible material and the other element of the cable holder 1, 1' are formed of a rather rigid material, the cable holder 1, 1' may be formed in a co-moulding process, e.g. injection moulding, by using different components for the flaps 9a, 9b and other parts of the cable holder 1, 1'.

Further, the mounting brackets 13, 13' may be provided with fastening sections 14, 14' and mounting sections 15, 15' as suitable for a certain application. The back 21 of the yoke 7 may be formed as suitable for providing a fastening organ 12, 12' which may accommodate the fastening section 14, 14'. Any slit 20, 20' may be provided with latches 18 and nibs 19 as required for affixing the mounting bracket 13, 13' to the cable holder 1, 1'.

Fixation organs 25, fixation elements 26, mounting elements 27 and fastening means 28 may be formed in any complementing manner such that they enable a convenient mounting of the cable holder 1, 1' to the supporting structure 24. It is, however, desirable to match the fixation elements 26 and the mounting elements 27 such that the cable holders 1, 1' may be mounted to the supportive structure 24 in predefined positions representing certain designated rack unit increments in order to assign each of the cable holders 1, 1' to a designated rack space.

Finally, in order to orientate the cable holders 1, 1' individually or together as a cable management system 100 in a certain angle with respect to the supporting structure 24, the mounting angles $\alpha_1$ to $\alpha_3$, $\alpha_1'$ to $\alpha_3'$, and orientation angles $\omega_1$ to $\omega_3$ may be chosen as required for guiding the cables 23 in or along the supporting structure 24.

The invention claimed is:

1. Cable holder for guiding a plurality of computer-network cables, comprising a loop with an inner circumference at least partially adapted to provide a support for the cables, the loop being formed of a first leg and a second leg extending essentially parallel to each other and being interconnected at a proximal end segment of each of the first and the second leg via a yoke, and a closure section, arranged at a distal end segment of each of the first and the second leg, wherein the closure section comprises a first resilient flap which is arranged at the distal end segment of the first leg and a second resilient flap which is arranged at the distal end segment of the second leg, wherein the first and second resilient flaps are at least partially formed of flexible material, the first resilient flap extends towards the opposing distal end segment of the second leg and the second resilient flap extends towards the opposing distal end of the first leg, a first tab portion of the first flap cooperates with a corresponding second tab portion of the second flap such that the first and second tab portions are in an overlapped front-to-back orientation to define a closure, wherein the first and second resilient flaps substantially close the closure section in a resting position of the first and second resilient flaps, the first and second tab portions of the first and second resilient flaps being resiliently deflected in an insertion direction of the cable and towards the yoke from a resting position to a position inside the loop to provide an access entry into the loop.

2. Cable holder according to claim 1, wherein the first and second flaps have an essentially triangular cross-section in an axial direction of the loop, the essentially triangular cross-section tapering in the direction of the opposing further end segment of the second or the first leg, respectively.

3. Cable holder according to claim 1, wherein a fastening organ is arranged at a back of the yoke partly constituting the outer circumference of the loop, the fastening organ being adapted to attach a mounting bracket thereto.

4. Cable holder according to claim 3, wherein the fastening organ comprises a slit which is adapted to accommodate an attachment section of the mounting bracket.

5. Cable holder according to claim 4, wherein the slit is formed between a latch and the back of the yoke, and in that the back of the yoke is formed as an essentially flat base facing in a radial direction of the loop.

6. Cable holder according to claim 4, wherein a longitudinal direction of the slit extends away from the yoke in a radial direction of the loop.

7. Cable holder according to claim 1, wherein the circumference of the loop is at least partially rounded in an axial direction of the loop.

8. Cable holder according to claim 1, wherein a height of the cable holder being measured perpendicularly to the extension of the first and the second legs essentially corresponds to a rack unit height of a standardized rack format.

9. Cable holder according to claim 1, wherein at an upper side and/or lower side of the cable holder at least one coupling organ is provided, which is adapted to engage with another cable holder, respectively.

10. Kit comprising at least one cable holder according to claim 1 and a plurality of mounting brackets adapted to be attached to the cable holder, wherein the mounting brackets comprise an attachment section, the attachment section adapted to be attached to the cable holder and a mounting section adapted to be fixed to a supporting structure of an electronic device or rack.

11. Kit according to claim 10 above, wherein the attachment section and the mounting section of at least two of the plurality of mounting brackets define different mounting angles between each other.

12. Cable management system for guiding a plurality of computer network cables at a rack or a cabinet for electronic devices, wherein the cable management system comprises at least one cable holder according to claim 1 above.

13. Cable holder for guiding a plurality of computer-network cables, comprising a loop with an inner circumference at least partially adapted to provide a support for the cables, the loop being formed of a first leg and a second leg extending essentially parallel to each other and being interconnected at a proximal end segment of each of the first and the second leg via a yoke, and a closure section, arranged at distal end segment of each of the first and the second leg, wherein the closure section comprises a first resilient flap depending from the distal end segment of the first leg and a second resilient flap depending from the distal end segment of the second leg, a first tab portion of the first resilient flap cooperates with a corresponding second tab portion of the second resilient flap such that the first and second tab portions are in an overlapped front-to-back orientation to define a closure, wherein the first and second resilient flaps substantially close the closure section in a resting position of the first and second resilient flaps, the first and second resilient flaps being movable from a resting position where the first and second resilient flaps are overlapping to a position where the first and second tab portions of the first and second resilient flaps are resiliently deflected in an insertion direction of the cable and towards the yoke to provide an access entry into the loop.

14. Cable holder for guiding a plurality of computer-network cables, comprising a loop with an inner circumference at least partially adapted to provide a support for the cables, the loop being formed of a first leg and a second leg extending essentially parallel to each other and being interconnected at a proximal end segment of each of the first and the second leg via a yoke, and a closure section, arranged at a distal end segment of each of the first and the second leg, wherein the closure section comprises at least one flap which is arranged at the distal end segment of the first or the second leg and extends towards the opposing distal end segment of the second or the first leg, respectively, wherein the at least one flap substantially closes the opposing distal end segment of the second or the first leg, respectively, in a resting position of the at least one flap, the at least one flap being adapted to be resiliently deflected from its resting position to provide an access entry into the loop, and the at least one flap has an essentially triangular cross-section in an axial direction of the loop, the essentially triangular cross-section tapering in the direction of the opposing further end segment of the second or the first leg, respectively.

15. Cable holder according to claim 14, wherein the at least one flap overlaps with the opposing distal end segment of the second or the first leg, respectively, in a radial direction of the loop in a resting position.

16. Cable holder according to claim 14, wherein the at least one flap is at least partially formed of flexible material.

17. Cable holder according to claim 14, wherein it is provided that at least one further flap overlaps the at least one flap in the radial direction of the loop, the at least one further flap being located at the opposing distal end segment of the second or the first leg, respectively.

18. The cable holder of claim 1, wherein the at least one flap is a first flap depending from the first leg and projecting towards the second leg, and further comprising a second flap, depending from the second leg and projecting towards the first leg.

19. The cable holder of claim 18, wherein the first and second flaps overlap each other and are resiliently deflectable together into the loop.

20. The cable holder of claim 13, wherein the first and second flaps are resiliently deflectable together into the loop.

* * * * *